May 26, 1931.  W. OWEN  1,806,861
APPARATUS FOR MAKING COMPOSITE GLASS
Filed June 1, 1928  2 Sheets-Sheet 1
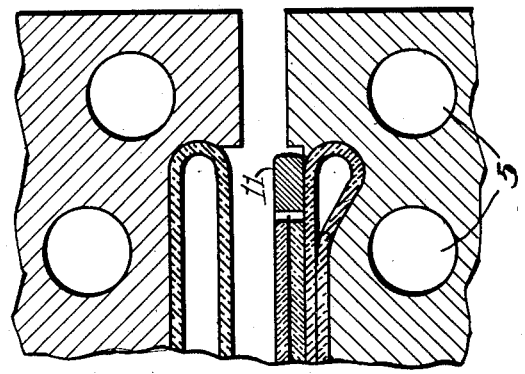
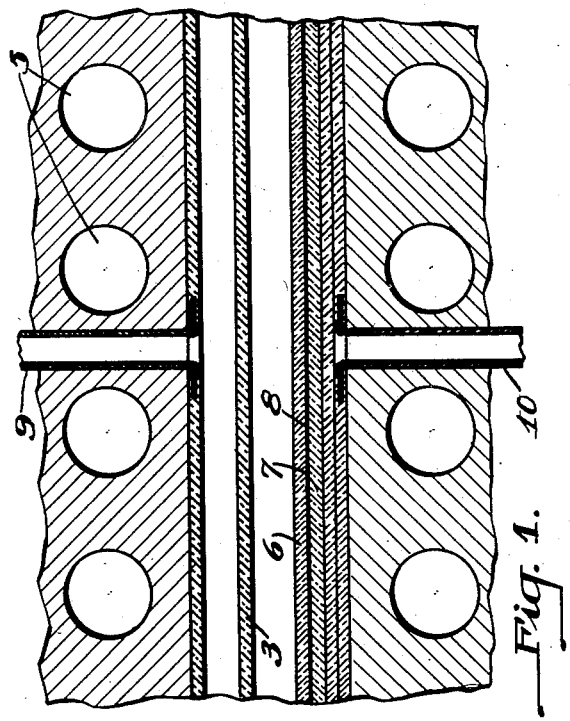
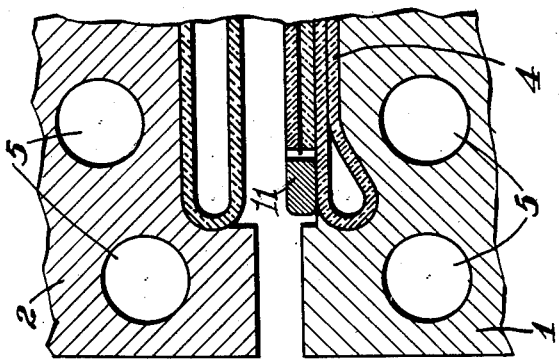
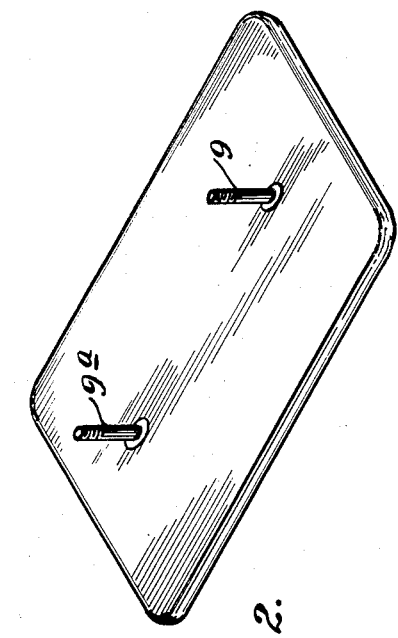
INVENTOR
William Owen
by
James C. Bradley
Atty May 26, 1931.  W. OWEN  1,806,861
APPARATUS FOR MAKING COMPOSITE GLASS
Filed June 1, 1928  2 Sheets-Sheet 2
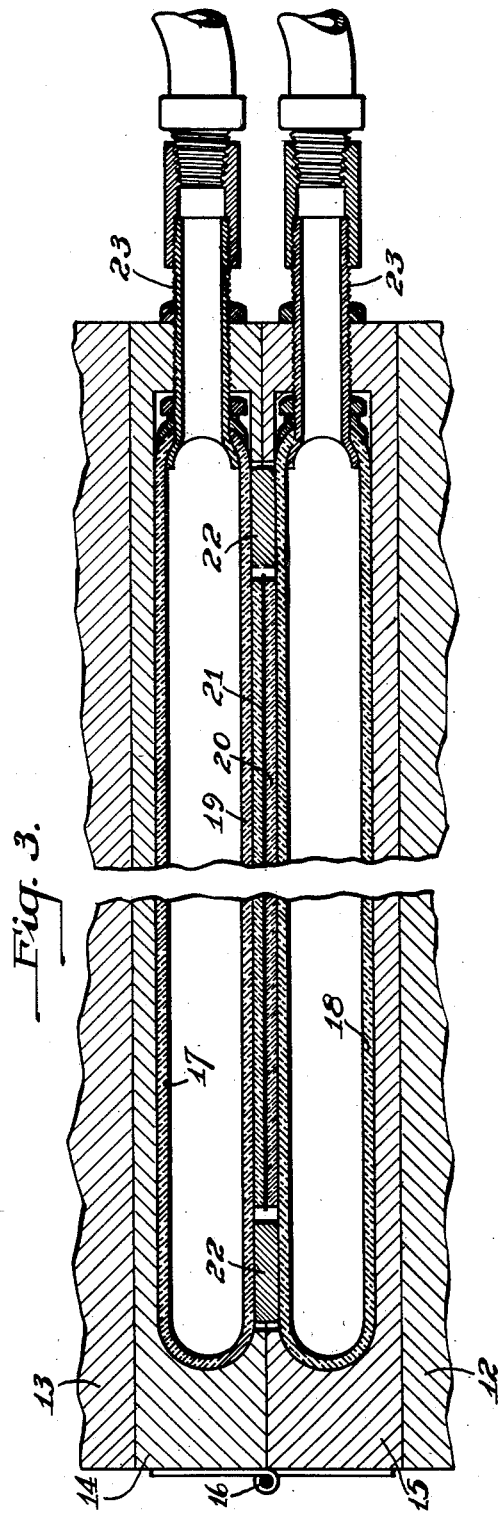
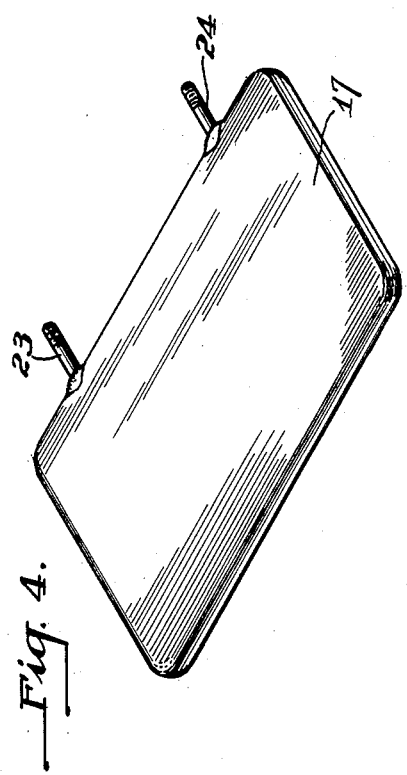
INVENTOR
William Owen
by James C Bradley
atty Patented May 26, 1931

1,806,861

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

APPARATUS FOR MAKING COMPOSITE GLASS

Application filed June 1, 1928. Serial No. 282,092.

The invention relates to apparatus for making composite glass, wherein heat and pressure are applied to cause a joinder between the glass and celluloid or other pyroxylin plastic sheet. Composite glass ordinarily comprises two sheets of glass with a sheet of celluloid or equivalent material cemented therebetween, although a greater number of sheets may be employed. It is the practice to assemble the sheets with a coating of cement, such as gelatin, dried upon the surfaces of the glass sheets which are to be cemented to the celluloid, the heat subsequently applied serving to soften the gelatin and secure adhesion when pressure is applied. The present invention has for its primary objects, the provisions of an improved construction which can be operated with rapidity and with a small percentage of breakage. Certain embodiments of the invention are illustrated in the accompanying drawings, wherein:

Figure 1 is a vertical section through one form of the construction. Fig. 2 is a perspective view of one of the rubber containers used in the Fig. 1 construction. Fig. 3 is a vertical section through another form of construction. And Fig. 4 is a perspective view of the rubber container used in the construction of Fig. 3.

Referring to Figs. 1 and 2, the numerals 1 and 2 designate a pair of opposing metal platens which have their faces recessed so as to carry the rubber containers 3 and 4. The platens are provided with a plurality of passages 5, 5 through which steam and water may be circulated for successively heating and cooling the platens, suitable connections being made with the necessary steam and water supply pipes. The platens are separable, and for convenience in handling and moving them toward and from each other, they may be mounted in a press such as that shown in the application of W. O. Lytle, Serial Number 164,511. In operation, the platens are separated so that the sheets to be joined together may be conveniently positioned between the rubber containers, after which the platens are moved together and securely clamped in this position during the pressing and heating operations.

As shown in Fig. 1, the pair of glass sheets 6 and 7 are shown in position upon the container 4, with the sheet of celluloid 8 interposed therebetween. The glass sheets are provided on their inner faces with a dried film of gelatin or other cement for joining the three sheets together upon the application of heat and pressure thereto. The containers 3 and 4 are provided with the supply pipes 9 and 10 connected to a suitable source of pressure, and after the platens have been brought together, pressure is supplied through the pipes to any desired extent, a pressure of about 150 pounds per square inch having been found satisfactory. The containers are also provided with exhaust pipes 9a (Fig. 2) by means of which the water in the containers may be withdrawn, if desired. The spacing strips 11 are employed along the edges of the sheets in order to prevent too great pressure on the edges of the sheets which tends to thin the pyrolin and squeeze it out. After the application of pressure, steam is circulated through the passages 5, 5, heating the platens, the containers 3 and 4 with the liquid therein and the set of plates between the containers. The temperature of the sheets is brought to about 250 degrees F., which gives the necessary softening of the cement and celluloid in order to make a proper union between the sheets. After the temperature and pressure above indicated have been arrived at, the flow of steam through the passages 5 is substituted by one of water and this is continued until the platens and the parts therebetween have been reduced in temperature so that the composite plate formed between the containers can be conveniently handled. During this drop in temperature, the pressure is maintained in the containers, as this has been found necessary in order to secure a satisfactory joinder of the sheets. After the parts have been sufficiently reduced in temperature, the pressure is released and the platens 1 and 2 are separated and the set of sheets, now securely joined together to form a composite plate, are removed from the press.

In the construction of Figs. 3 and 4, the members 12 and 13 are relatively fixed, the structure being preferably in the form of a cabinet as shown in my Patent No. 1,657,227. Fitting snugly between the members 12 and 13 is a metal container comprising the plates 14 and 15 hinged together at 16 and adapted to carry the rubber containers 17 and 18. These containers are adapted to carry between them the three sheets 19, 20 and 21 to be joined together, such sheets being prepared as described in connection with Fig. 1. Suitable spacing strips 22 are provided around the edges of the sheets the same as in the Fig. 1 construction. Each container is provided with a pair of pipe connections 23 and 24 by means of which water under pressure may be circulated through the containers.

In using this form of apparatus, hot water is first circulated through the containers until the sheets 19, 20 and 21 arrive at a temperature of about 250 degrees F. and the pressure in the containers is brought to about 150 pounds per square inch. After this temperature and pressure have been attained, the temperature of the circulating water is reduced, the pressure being maintained, however. This operation is continued until the temperature of the circulated water is at a minimum and the sheets are cooled down to a temperature at which they may be conveniently handled, after which the pressure is released and the plates 14 and 15 are removed from between the members 12 and 13 and opened so that the composite plate formed therebetween may be removed.

What I claim is:

1. Apparatus for applying heat and pressure to a plurality of sheets to be joined together comprising, a pair of opposing platens each provided with an outwardly opening recess having a substantially flat rear wall and edge walls extending transversely of the rear wall to the faces of the platens, rubber containers seated in the recesses and supported at their edges by the edge walls of the recesses and adapted to receive between them the sheets to be joined, said edge walls being rounded outwardly, means for supplying liquid under pressure to the interior of the containers, and means for affecting predetermined temperature changes in said liquids.

2. Apparatus for applying heat and pressure to a plurality of sheets to be joined together comprising, a pair of opposing platens each provided with an outwardly opening recess having a substantially flat rear wall and edge walls extending transversely of the rear wall to the faces of the platens, and having back of said recesses passages for receiving and cooling fluids, rubber containers seated in the recesses and supported at their edges by the edge walls of the recesses and adapted to receive between them the sheets to be joined, means for supplying liquid under pressure to the interior of the containers, and means for successively circulating a heating fluid and a cooling fluid through said passages, said edge walls being rounded outwardly.

3. Apparatus for applying heat and pressure to a plurality of sheets to be joined comprising a pair of opposing separable platens, one of which is provided with an outwardly opening recess having a substantially flat rear wall and outwardly curving edge walls extending transversely of the rear wall to the face of the platen, a flat rubber container seated in said recess and supported at its edges by said edge walls so that the sheets to be joined together may be positioned between the outer face of the container and the face of the opposing platen, means for supplying fluid under pressure to the interior of the container, and means whereby one of the platens is heated.

In testimony whereof, I have hereunto subscribed my name this 17th day of May, 1928.
WILLIAM OWEN.